(12) United States Patent
Yoo et al.

(10) Patent No.: US 11,984,269 B2
(45) Date of Patent: May 14, 2024

(54) CERAMIC ELECTRONIC COMPONENT

(71) Applicant: SAMSUNG ELECTRO-MECHANICS CO., LTD., Suwon-si (KR)

(72) Inventors: Won Hee Yoo, Suwon-si (KR); Min Seop Kim, Suwon-si (KR); Jin Man Jung, Suwon-si (KR); Hyo Joong Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 30 days.

(21) Appl. No.: 17/669,677

(22) Filed: Feb. 11, 2022

(65) Prior Publication Data

US 2023/0170148 A1    Jun. 1, 2023

(30) Foreign Application Priority Data

Nov. 29, 2021  (KR) .................. 10-2021-0167099

(51) Int. Cl.
| | |
|---|---|
| *H01G 4/30* | (2006.01) |
| *H01G 4/008* | (2006.01) |
| *H01G 4/012* | (2006.01) |
| *H01G 4/248* | (2006.01) |

(52) U.S. Cl.
CPC ............. *H01G 4/30* (2013.01); *H01G 4/008* (2013.01); *H01G 4/012* (2013.01); *H01G 4/248* (2013.01)

(58) Field of Classification Search
CPC .......... H01G 4/30; H01G 4/008; H01G 4/012; H01G 4/248
See application file for complete search history.

(56) References Cited

U.S. PATENT DOCUMENTS

| | | | | |
|---|---|---|---|---|
| 2001/0055192 A1* | 12/2001 | Nakano | ............... | H01G 4/30 361/306.3 |
| 2005/0207096 A1* | 9/2005 | Hinoki | ............... | H01G 11/38 361/502 |
| 2009/0296315 A1* | 12/2009 | Eguchi | ............... | H01G 11/32 977/773 |
| 2012/0327558 A1* | 12/2012 | Jeong | ............... | B82Y 30/00 977/788 |
| 2013/0038982 A1 | 2/2013 | Lee et al. | | |
| 2013/0045385 A1 | 2/2013 | Kim et al. | | |

(Continued)

FOREIGN PATENT DOCUMENTS

| | | |
|---|---|---|
| JP | H02-94618 A | 4/1990 |
| JP | H09-186044 A | 7/1997 |

(Continued)

OTHER PUBLICATIONS

Japanese Office Action dated Feb. 7, 2023 issued in Japanese Patent Application No. 2022-023333 (with English translation).

*Primary Examiner* — Michael P McFadden
(74) *Attorney, Agent, or Firm* — Morgan, Lewis & Bockius LLP

(57) ABSTRACT

A ceramic electronic component includes a body including a dielectric layer and an internal electrode; and an external electrode disposed on the body, wherein a first carbon material is disposed in the internal electrode. The first carbon material includes carbon black, which has conductivity, a substantially spherical shape, and a particle diameter of 0.05 μm or less.

19 Claims, 6 Drawing Sheets

(56) References Cited

U.S. PATENT DOCUMENTS

| | | | | |
|---|---|---|---|---|
| 2015/0092316 | A1* | 4/2015 | Chun | ................... H01G 4/30 427/79 |
| 2018/0144863 | A1 | 5/2018 | Kim et al. | |
| 2021/0090804 | A1* | 3/2021 | Park | ................... H01G 4/2325 |

FOREIGN PATENT DOCUMENTS

| | | |
|---|---|---|
| JP | 2000-150293 A | 5/2000 |
| JP | 2013-42110 A | 2/2013 |
| JP | 2013-40403 A | 3/2013 |
| WO | 01/33588 A1 | 5/2001 |

* cited by examiner

CERAMIC ELECTRONIC COMPONENT

CROSS-REFERENCE TO RELATED APPLICATIONS

This application claims benefit of priority to Korean Patent Application No. 10-2021-0167099 filed on Nov. 29, 2021 in the Korean Intellectual Property Office, the disclosures of which are incorporated herein by references in its entirety.

TECHNICAL FIELD

The present disclosure relates to a ceramic electronic component, and more particularly, to a multilayer ceramic capacitor.

BACKGROUND

The implementation of miniaturization and high capacity in multilayer ceramic capacitors has been necessary, along with the implementation of complexity and high performance in electronic devices. Also, high reliability has also been necessary for application to electronic components. To secure miniaturization, high capacity, and high reliability of a multilayer ceramic capacitor, relevant development has been conducted in various fields. For example, it has been necessary to improve properties of an internal electrode forming a laminate structure by being alternately disposed with a dielectric layer.

SUMMARY

An aspect of the present disclosure is to provide a ceramic electronic component which may improve electrical properties.

Another aspect of the present disclosure is to provide a ceramic electronic component having improved high-temperature load reliability.

According to an aspect of the present disclosure, by forming an internal electrode using a conductive paste including a carbon material, the carbon material may be be disposed in the internal electrode and/or on an interfacial surface between a dielectric layer and the internal electrode after sintering.

For example, a ceramic electronic component includes a body including a dielectric layer and an internal electrode; and an external electrode disposed on the body, wherein a first carbon material is disposed in the internal electrode.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
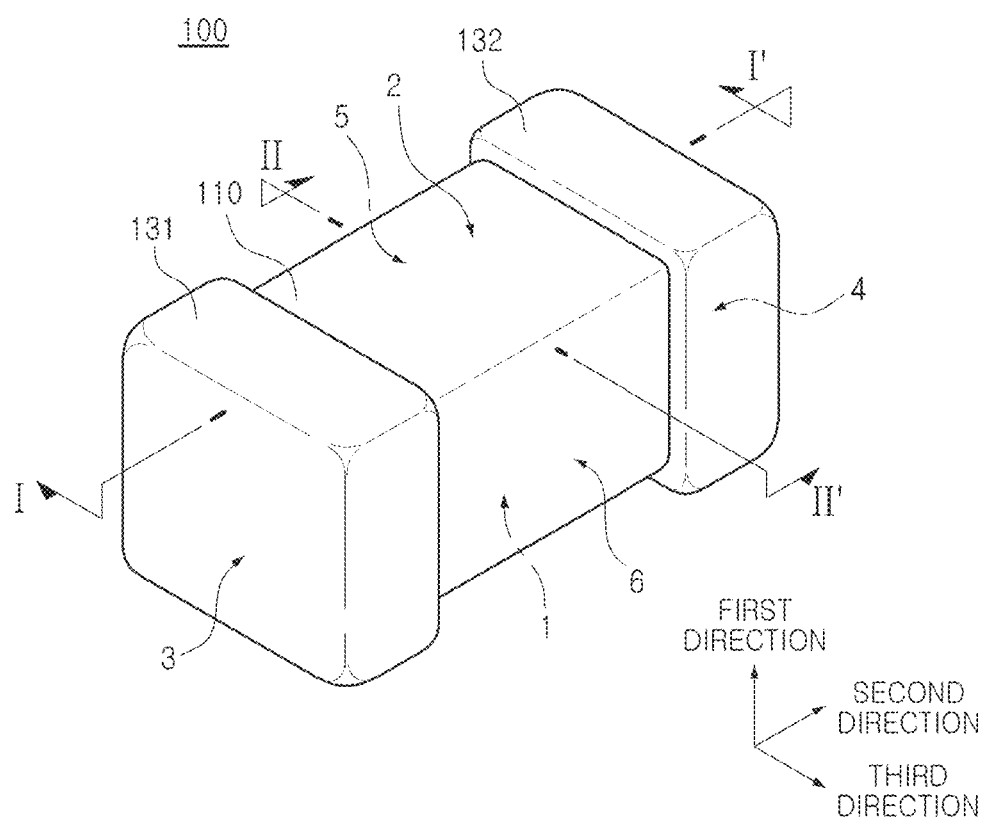
FIG. 1 is a perspective diagram illustrating a ceramic electronic component according to an example embodiment of the present disclosure.

Hereinafter, embodiments of the present disclosure will be described as follows with reference to the attached drawings.

In the accompanying drawings, some elements may be exaggerated, omitted or briefly illustrated, and the sizes of the elements do not necessarily reflect the actual sizes of these elements.

In the drawings, the first direction may be defined as a thickness direction, the second direction may be defined as a length direction, and the third direction may be defined as a width direction.

FIG. 1 is a perspective diagram illustrating a ceramic electronic component according to an example embodiment.

Figure 2:
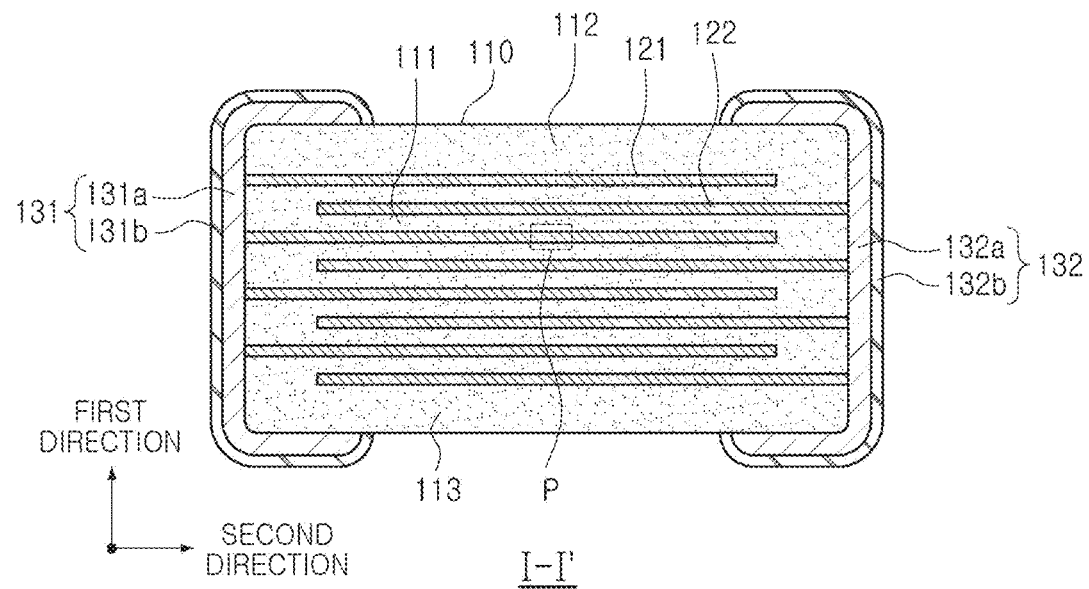
FIG. 2 is a cross-sectional diagram taken along line I-I' in FIG. 1.

FIG. 2 is a cross-sectional diagram taken along line I-I' in FIG. 1.

Figure 3:
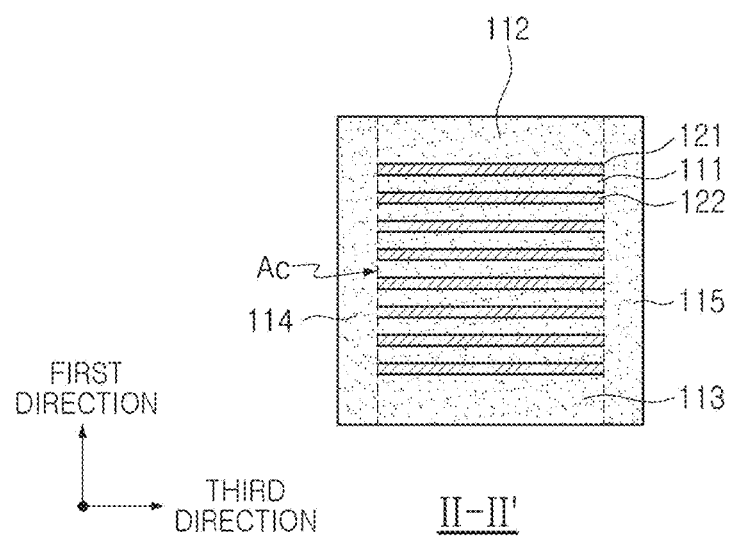
FIG. 3 is a cross-sectional diagram taken along line II-II' in FIG. 1.

FIG. 3 is a cross-sectional diagram taken along line II-II' in FIG. 1.

The shape of the body 110 may not be limited to any particular shape, but the body 110 may have a hexahedral shape or a shape similar to a hexahedral shape. Due to reduction of ceramic powder included in the body 110 during a baking and/or a sintering process, the body 110 may not have an exactly hexahedral shape formed by linear lines but may have a substantially hexahedral shape. The angular shape of the body 110, such as, for example, a corner portion thereof may be polished to be rounded by a polishing process.

The body 110 may have first and second surfaces 1 and 2 opposing each other in the thickness direction, third and fourth surfaces 3 and 4 connected to the first and second surfaces 1 and 2 and opposing each other in the length direction, and fifth and sixth surfaces 5 and 6 connected to the first and second surfaces 1 and 2 and the third and fourth surfaces 3 and 4 and opposing each other in the width direction.

In the body 110, the dielectric layer 111 and internal electrodes 121 and 122 may be alternately laminated. The plurality of dielectric layers 111 may be in a baked and/or sintered state, and a boundary between the adjacent dielectric layers 111 may be integrated with each other such that boundaries therebetween may not be distinct without using a scanning electron microscope (SEM).

The dielectric layer 111 may be formed by baking a ceramic green sheet including ceramic powder, an organic solvent, and an organic binder. The ceramic powder may be a material having a high dielectric constant, and a barium titanate ($BaTiO_3$) material or a strontium titanate ($SrTiO_3$) material may be used, but an example embodiment thereof is not limited thereto.

The thickness of the dielectric layer 111 may not be limited to any particular size, but generally, when the dielectric layer 111 is formed to have a thickness of less than 0.6 µm, in particular, when the thickness of the dielectric layer 111 is 0.4 µm or less, reliability may degrade. In the example embodiment, excellent reliability may be secured even when the thickness of the dielectric layer 111 is 0.4 µm or less. Accordingly, when the thickness of the dielectric layer 111 is 0.4 µm or less, the effect of reliability improvement in the example embodiment may increase, and miniaturization and high capacity may be easily implemented in the ceramic electronic component.

The thickness of the dielectric layer 111 may refer to an average thickness of the dielectric layer 111 disposed between the internal electrodes 121 and 122. The average thickness of the dielectric layer 111 may be measured by scanning an image of the cross-sectional surface of the body 110 taken in the length and thickness directions using a scanning electron microscope at a magnification of 10,000. More specifically, the average value may be measured by measuring the thickness of a dielectric layer at 30 equally spaced points in the length direction in the scanned image. The 30 equally spaced points may be designated in an active portion Ac, which will be described later. Also, when the measurement of the average value is extended to 10 dielectric layers 111, the average thickness of the dielectric layer 111 may be further generalized.

The body 110 may include an active portion Ac including a plurality of first internal electrodes 121 and a plurality of second internal electrodes 122 disposed to oppose each other with the dielectric layer 111 interposed therebetween. The active portion Ac may contribute to the formation of capacitance of the capacitor, and may be formed by alternately laminating the plurality of first internal electrodes 121 and the plurality of second internal electrodes 122 with the dielectric layer 111 interposed therebetween.

The body 110 may further include cover portions 112 and 113 disposed on the upper and lower portions of the active portion Ac with respect to the thickness direction. The cover portions 112 and 113 may include a first cover portion 112 disposed above the active portion Ac and a second cover portion 113 disposed below the active portion Ac. The first cover portion 112 and the second cover portion 113 may be formed by laminating a single dielectric layer or two or more dielectric layers on the upper and lower surfaces of the active portion Ac in the thickness direction, respectively, and may prevent damage to the internal electrodes caused by physical or chemical stress. The cover portions 112 and 113 may not include internal electrodes and may include the same material as that of the dielectric layer 111. For example, the cover portions 112 and 113 may include a ceramic material, such as, for example, a barium titanate material described above. Accordingly, the boundary between the cover portions 112 and 113 and the adjacent dielectric layer 111 may be integrated such that a boundary therebetween may not be distinct without using a scanning electron microscope. In this aspect, the cover portions 112 and 113 may include the dielectric layer 111. For example, the cover portions 112 and 113 may be formed by the dielectric layers 111. The thickness of the cover portions 112 and 113 may not be limited to any particular size. However, to easily implement miniaturization and high capacity of the ceramic electronic component, the thickness of the cover portions 112 and 113 may be 20 µm or less.

The body 110 may further include margin portions 114 and 115 disposed on both sides of the active portion Ac in the width direction. The margin portions 114 and 115 may include a first margin portion 114 providing the fifth surface 5 of the body 110 and a second margin portion 115 providing the sixth surface 6. The margins 114 and 115 may refer to a region between both ends of the internal electrodes 121 and 122 and the boundary surface of the body 110 on the cross-sectional surface of the body 110 cut out in the width-thickness direction. The margins 114 and 115 may prevent damage to the internal electrodes 121 and 122 caused by physical or chemical stress. The margins 114 and 115 may include a material the same as or different from a material of the dielectric layer 111. For example, the margin portions 114 and 115 may be formed by forming internal electrodes by applying a conductive paste to the ceramic green sheet other than in the region in which the margin portion is formed. Alternatively, to prevent a step difference due to the internal electrodes 121 and 122, the internal electrodes 121 and 122 may be cut out to be exposed after being laminated, and a single dielectric layer or two or more dielectric layers may be laminated on both side portions of the active portion Ac in the width direction, thereby forming the margin portions 114 and 115.

The internal electrodes 121 and 122 may be alternately laminated with the dielectric layer 111. The internal electrodes 121 and 122 may include a plurality of first internal electrodes 121 and a plurality of second internal electrodes 122. The plurality of first internal electrodes 121 and the plurality of second internal electrodes 122 may be alternately disposed to oppose each other with the dielectric layer 111 interposed therebetween, and may be exposed to the third surface 3 and the fourth surface 4, respectively. For example, each of the plurality of first internal electrodes 121 may be spaced apart from the fourth surface 4 and may be exposed through the third surface 3. Also, each of the plurality of second internal electrodes 122 may be spaced apart from the third surface 3 and may be exposed through the fourth surface 4. The plurality of first internal electrodes 121 and the plurality of second internal electrodes 122 may be electrically isolated from each other by the dielectric layer 111 disposed therebetween. The plurality of first internal electrodes 121 and the plurality of second internal electrodes 122 may be alternately laminated in the thickness direction, but an example embodiment thereof is not limited thereto, and the plurality of first internal electrodes 121 and the plurality of second internal electrodes 122 may be alternately laminated in the width direction.

The internal electrodes 121 and 122 may be formed of a conductive paste including a conductive metal and a common material. For example, the internal electrodes 121 and 122 may be printed by printing a conductive paste on the ceramic green sheet forming the dielectric layer 111 through a printing method such as a screen printing method or a gravure printing method. By alternately laminating the ceramic green sheets printed with the internal electrodes 121 and 122 and baking and/or sintering the sheets, the active portion Ac of the body 110 may be formed. The conductive metal may include nickel (Ni), copper (Cu), palladium (Pd), silver (Ag), gold (Au), platinum (Pt), tin (Sn), tungsten (W), titanium (Ti), and/or alloys thereof, and may include, for example, nickel (Ni), but an example embodiment thereof is not limited thereto. The common material may include a carbon material, such as, for example, carbon black, graphite, and the like, and may include, for example, carbon black, but an example embodiment thereof is not limited thereto.

Since the sintering temperature of the nickel (Ni) internal electrode is about 600 degrees lower than that of the ceramic dielectric, the sintering shrinkage delay of the internal electrode may be implemented using a ceramic material, which may be the same material as a dielectric, as a sintering inhibitor. However, in this case, non-uniformity of the dielectric composition may occur due to the ceramic material, and due to side effects of coarse grains, which may be difficult to be controlled, it may be difficult to improve electrical properties and reliability.

However, as for the ceramic electronic component 100 according to an example, a carbon material other than ceramic, such as, for example, carbon black, may be used as a common material in the conductive paste for forming the internal electrodes 121 and 122. In this case, electrical properties may improve, and excellent high-temperature load reliability may be secured. For example, an equivalent or higher level of internal electrode connectivity may be implemented by replacing the ceramic material. Also, the uniformity of the dielectric composition may be maintained by applying the common material from which the reaction with the dielectric is removed, and the formation of coarse grains may be prevented. Accordingly, electrical properties and reliability may improve.

Also, in the ceramic electronic component 100 according to an example embodiment, a carbon material, such as, for example, carbon black, may be disposed in the internal electrodes 121 and 122, and/or on the interfacial surface between the dielectric layer 111 and the internal electrode 121 and 122 even after sintering. For example, a carbon material, such as carbon black, may remain without being decomposed. Accordingly, electrical properties and reliability may improve due to coverage bridge properties of a defective portion of the connection between the internal electrodes 121 and 122, which may be advantageous in implementing the internal electrodes 121 and 122 to have a reduced thickness. Also, due to the heat dissipation function through the carbon material, heat accumulation may be reduced during a high-pressure operation.

The carbon material, such as, for example, carbon black may have a substantially spherical shape. The configuration of the substantially spherical shape of carbon black may include a perfectly spherical shape, and also a shape similar to a spherical shape. A carbon material having a substantially spherical shape, such as, for example, carbon black may have various shapes such as a hollow shape, a core-shell shape, and a filled shape. In this case, the above-described effect may be effectively implemented. The shape may be in the conductive paste, but an example embodiment thereof is not limited thereto, and the shape in the internal electrodes 121 and 122 after sintering or the shape on the interfacial surface with the dielectric layer 111 may also be the same as above.

Also, particles of the carbon material, such as, for example, carbon black, may be smaller than conductive particles, such as, for example, nickel (Ni) particles. For example, the particle diameter may be less than ½ of the nickel (Ni) particles. For example, the particle diameter may be 0.05 µm or less and more than 0 µm. The particle diameter may be measured by imaging the shape of the carbon black in the conductive paste using a TEM, or by polishing the body 110, exposing the internal electrodes 121 and 122 and imaging using a TEM. When a plurality of carbon blacks are present, each particle diameter may be 0.05 µm or less. In this case, the above-described effect may be implemented effectively. The particle diameter may be the particle diameter in the conductive paste, but an example embodiment thereof is not limited thereto, and the particle diameter in the internal electrodes 121 and 122 after sintering or the particle diameter on the interfacial surface with the dielectric layer 111 may also be substantially the same as above.

The particle diameter of the conductive particles may be measured by, for example, imaging the shape of the conductive particles in the conductive paste using scanning electron microscope (SEM) or TEM.

Also, the carbon material, such as, for example, carbon black may have conductivity. Similarly, in this case, the carbon material may effectively work as the above-described sintering inhibitor. In this case, the above-described effect may be implemented effectively. Such conductivity may also be obtained in the conductive paste, and also in the internal electrodes 121 and 122 after sintering, or on the interfacial surface with the dielectric layer 111.

The thickness of the internal electrodes 121 and 122 may not be limited to any particular size, but generally, when the internal electrodes 121 and 122 are formed to have a thickness of less than 0.6 µm, in particular, when the thickness of the internal electrodes 121 and 122 is 0.4 µm or less, reliability may degrade. However, in the example embodiment, excellent reliability may be secured even when the thickness of the internal electrodes 121 and 122 is 0.4 µm or less. Accordingly, when the thickness of the internal electrodes 121 and 122 is 0.4 µm or less, the effect of reliability improvement in the example embodiment may increase, and miniaturization and high capacity of the ceramic electronic component may be easily implemented.

The thickness of the internal electrodes 121 and 122 may refer to the average thickness of the internal electrodes 121 and 122. The average thickness of the internal electrodes 121 and 122 may be measured by scanning an image of the cross-sectional surface of the body 110 in the length and thickness directions using a scanning electron microscope at a magnification of 10,000. More specifically, the average value may be measured by measuring the thickness of an internal electrode at 30 equally spaced points in the length direction in the scanned image. The 30 equally spaced points may be designated in the active portion Ac. Also, when the measurement of the average value is extended to 10 internal electrodes, the average thickness of the internal electrode 111 may be further generalized.

The external electrodes 131 and 132 may be disposed on the third surface 3 and the fourth surface 4 of the body 110, and a portion thereof may extend to the first surface 1, the second surface 2, and the fifth surface 5 and the sixth surface 6. The external electrodes 131 and 132 may include first external electrodes 131 and second external electrodes 132 connected to the plurality of first internal electrodes 121 and the plurality of second internal electrodes 122, respectively. The first external electrode 131 may be disposed on the third surface 3 of the body 110, and a portion thereof may extend to the first surface 1, the second surface 2, the fifth surface 5 and the sixth surface 6 of the body 110. The second external electrode 132 may be disposed on the fourth surface 4 of the body 110, and a portion thereof may extend to the first surface 1, the second surface 2, the fifth surface 5 and the sixth surface of the body 110. However, an example embodiment thereof is not limited thereto, and the number of the external electrodes 131 and 132 or the shape thereof may be varied according to the shape or other configurations of the internal electrodes 121 and 122.

The external electrodes 131 and 132 may be formed of any material as long as the material has electrical conductivity, such as metal, and a specific material may be determined in consideration of electrical properties and structural stability, and further, the external electrodes 131 and 132 may have a multilayer structure. For example, the external electrodes 131 and 132 may include first electrode layers 131*a* and 131*b* disposed on the body 110, and second electrode layers 131*b* and 132*b* disposed on the first electrode layers 131*a* and 132*a*.

The first electrode layers 131a and 132a may be, for example, baked electrodes including a conductive metal and glass. The first electrode layers 131a and 132a may be formed by dipping the body 110 in a paste including a conductive metal and glass. Alternatively, the first electrode layers 131a and 132a may be formed by transferring a sheet including a conductive metal and glass onto the body 110. As the conductive metal included in the first electrode layers 131a and 132a, a material having excellent electrical conductivity may be used, but an example embodiment thereof is not limited thereto. For example, the conductive metal may include copper (Cu), nickel (Ni), palladium (Pd), platinum (Pt), gold (Au), silver (Ag), lead (Pb), and/or alloys thereof, and may include, for example, copper (Cu) and/or nickel (Ni), but an example embodiment thereof is not limited thereto.

The first electrode layers 131a and 132a may be, for example, a resin-based electrode including a conductive metal and resin. The first electrode layers 131a and 132a may be formed by coating and curing a paste including a conductive metal and resin. As the conductive metal included in the first electrode layers 131a and 132a, a material having excellent electrical conductivity may be used, but an example embodiment thereof is not limited thereto. For example, the conductive metal may include copper (Cu), nickel (Ni), palladium (Pd), platinum (Pt), gold (Au), silver (Ag), lead (Pb) and/or alloys thereof, and may include, for example, copper (Cu) and/or nickel (Ni), but an example embodiment thereof is not limited thereto. An insulating resin may be used as the resin included in the first electrode layers 131a and 132a, but an example embodiment thereof is not limited thereto. For example, the resin may include an epoxy resin, but an example embodiment thereof is not limited thereto.

The first electrode layers 131a and 132a may have, for example, a multilayer shape in which the above-described resin-based electrode is disposed on the above-described baked electrode. However, an example embodiment thereof is not limited thereto, and other various electrode layers may be further disposed.

The second electrode layers 131b and 132b may improve mounting properties. The type of the second electrode layers 131b and 132b is not limited to any particular type, and may be a plating layer including nickel (Ni), tin (Sn), palladium (Pd) and/or alloys thereof, and may include a plurality of layers. The second electrode layers 131b and 132b may be, for example, a nickel (Ni) plating layer or a tin (Sn) plating layer, and a nickel (Ni) plating layer and a tin (Sn) plating layer may be formed in order on the first electrode layers 131a and 132a. Also, the second electrode layers 131b and 132b may include a plurality of nickel (Ni) plating layers and/or a plurality of tin (Sn) plating layers.

Figure 4:
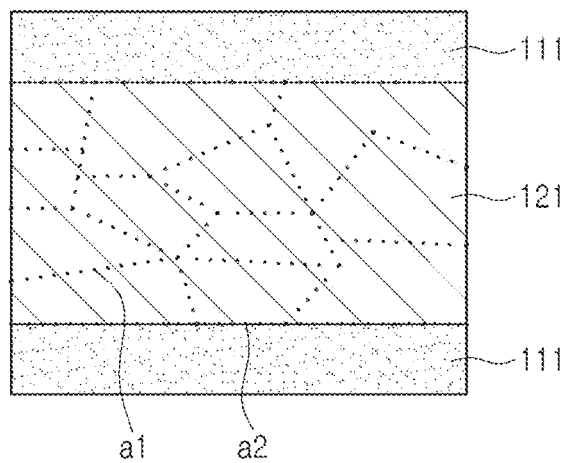
FIG. 4 is a cross-sectional diagram illustrating an example of region P in FIG. 2.

FIG. 4 is a cross-sectional diagram illustrating an example of region P in FIG. 2.

Referring to the drawings, a plurality of first carbon materials a1 may be disposed in the first internal electrode 121. Also, a plurality of second carbon materials a2 may be disposed on the interfacial surface between the dielectric layer 111 and the first internal electrode 121. The dielectric layer 111 may be in contact with the upper surface and the lower surface of the first internal electrode 121, and a plurality of second carbon materials a2 may be disposed on the interfacial surfaces between the dielectric layer 111 and the upper surface and the lower surface of the first internal electrode 121, respectively.

Each of the plurality of first carbon materials a1 may include the above-described carbon black. The plurality of first carbon materials a1 may form a cluster channel. The cluster channel may be formed by the plurality of first carbon materials a1 arranging in the first internal electrode 121 such that a plurality of channels may be formed, and the plurality of channels may be connected to each other. For example, a plurality of carbon black particles may be arranged in various directions in the internal electrode and may form several channels, and the channels may be connected to each other.

Each of the plurality of second carbon materials a2 may include the above-described carbon black. The plurality of second carbon materials a2 may form a cluster channel. The cluster channel may be formed by a plurality of second carbon materials a2 arranging linearly on the interfacial surface between the dielectric layer 111 and the first internal electrode 121 and forming a channel. For example, the plurality of carbon black particles may be arranged linearly on the interfacial surface between the dielectric layer and the internal electrode and may form a channel.

The arrangement of the plurality of first carbon materials a1 and the plurality of second carbon materials a2 has been described using the first internal electrode 121, and the same configuration may also be applied to the second internal electrode 122, and the detailed description thereof will not be provided.

Figure 5:
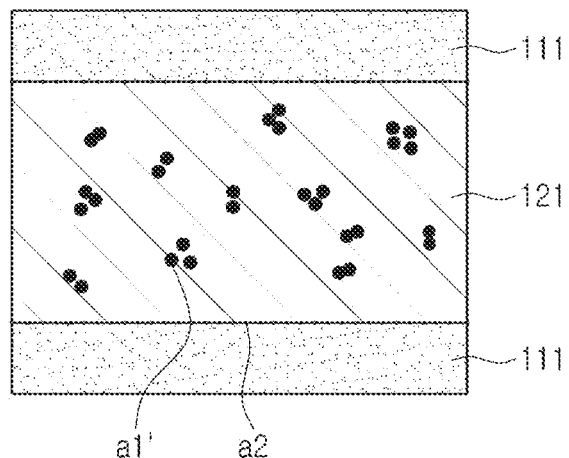
FIG. 5 is a cross-sectional diagram illustrating another example of region P in FIG. 2.

FIG. 5 is a cross-sectional diagram illustrating another example of region P in FIG. 2.

Referring to the drawings, a plurality of first carbon materials a1' may be disposed in the first internal electrode 121. Also, a plurality of second carbon materials a2 may be disposed on the interfacial surface between the dielectric layer 111 and the first internal electrode 121. The dielectric layer 111 may be in contact with the upper surface and the lower surface of the first internal electrode 121, and the plurality of second carbon materials a2 may be disposed on the interfacial surfaces between the dielectric layer 111 and the upper surface and the lower surface of the first internal electrode 121, respectively.

Each of the plurality of first carbon materials a1' may include the above-described carbon black. The plurality of first carbon materials a1' may form a cluster spot. The cluster spot may be formed by a portion of the plurality of first carbon materials a1' gathering and forming a plurality of spots in the first internal electrode 121, and the plurality of spots may be spaced apart from each other. The gathered first carbon materials a1' may or may not be in contact with each other. For example, carbon black particles may gather and form several spots in the internal electrode, and the spots may be spaced apart from each other.

Each of the plurality of second carbon materials a2 may include the above-described carbon black. The plurality of second carbon materials a2 may form a cluster channel. The cluster channel may be formed by a plurality of second carbon materials a2 arranging linearly on the interfacial surface between the dielectric layer 111 and the first internal electrode 121 and forming a channel. For example, the plurality of carbon black particles may be arranged linearly on the interfacial surface between the dielectric layer and the internal electrode and may form a channel.

The cluster channel and cluster spot disclosed herein may be observed by, for example, SEM or TEM.

Each particle of the plurality of first carbon material a1' disposed in the first internal electrode 121 may have a diameter greater than that of each particle of the plurality of second carbon materials a2 disposed on the interfacial surface between the dielectric layer 111 and the first internal electrode 121, but an example embodiment thereof is not limited thereto.

The arrangement of the plurality of first carbon materials a1' and the plurality of second carbon materials a2 has been described using the first internal electrode 121, and the same configuration may also be applied to the second internal electrode 122 and the detailed description thereof will not be provided.

Figures 6A, 6B:
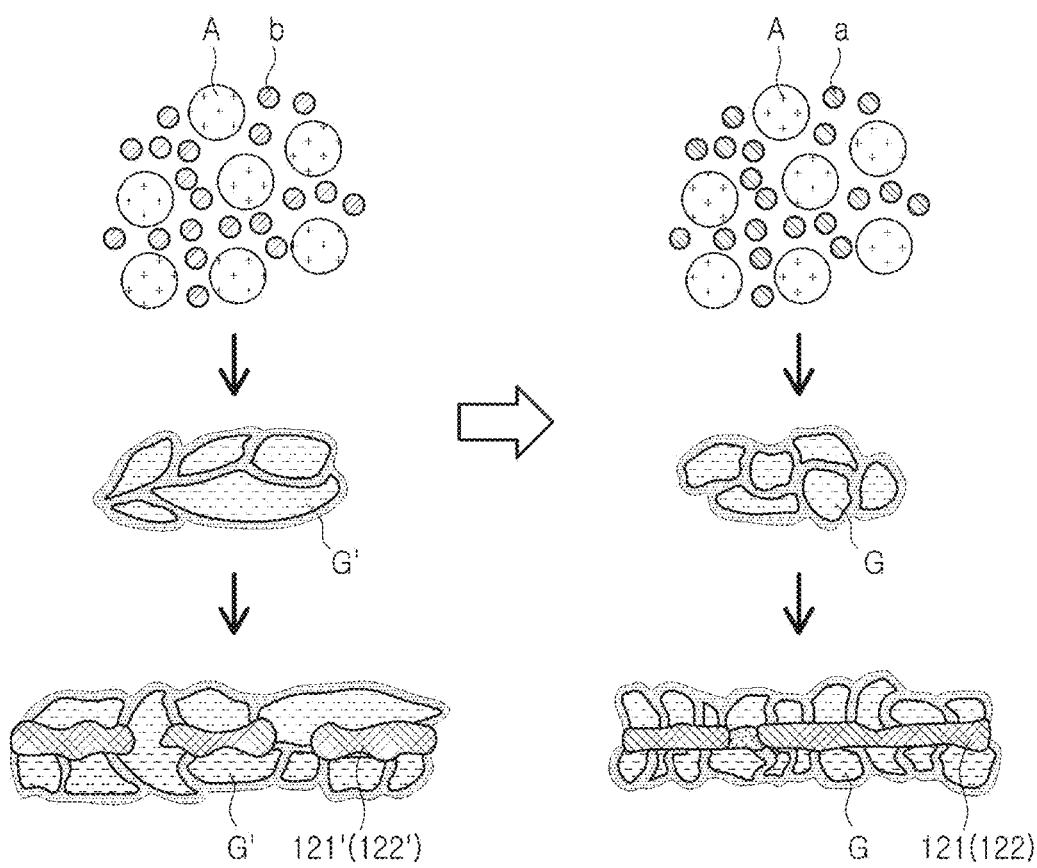
FIG. 6A is a diagram illustrating shapes of an internal electrode and a dielectric layer after sintering in an example in which ceramic is used as a material for forming an internal electrode.
FIG. 6B is a diagram illustrating shapes of an internal electrode and a dielectric layer after sintering in an example in which carbon black is used as a material for forming an internal electrode.

FIG. 6A is a diagram illustrating shapes of an internal electrode and a dielectric layer after sintering in an example in which ceramic is used as a material for forming an internal electrode. FIG. 6B is a diagram illustrating shapes of an internal electrode and a dielectric layer after sintering in an example in which carbon black is used as a material for forming an internal electrode.

Referring to the drawings, a material containing nickel (Ni) particles (A) and a ceramic material (b) is used as a conductive paste material for forming the internal electrodes 121' and 122' as in FIG. 6A, coarse grains G' may be formed during the sintering process, and the coarse grains G' may be distributed on the interfacial surface of the internal electrodes 121' and 122' after sintering, such that connectivity and smoothness of the internal electrodes 121' and 122' may degrade. However, when a material including nickel (Ni) particles (A) and carbon black common material (a) is used as a conductive paste material for forming the internal electrodes 121 and 122 as in FIG. 6B, grains may be prevented from being coarse during the sintering process, and the uniform grains G may be distributed on the interfacial surface of the internal electrodes 121 and 122 after sintering, such that the connectivity and smoothness of the internal electrodes 121 and 122 may improve. The size of the grains may be measured by, for example, observing a sample of a sintered internal electrode using SEM or TEM.

Figure 7:
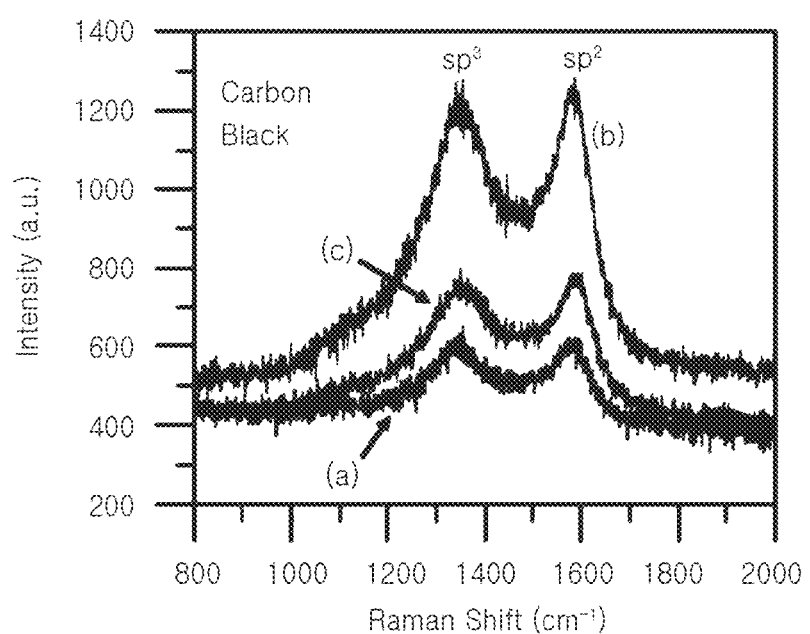
FIG. 7 is a spectrum of components of carbon black represented by Raman analysis.

FIG. 7 is a spectrum of components of carbon black represented by Raman analysis.

In the drawings, 7(a) is the Raman spectrum of carbon black in a powder state, 7 (b) is the Raman spectrum after sintering carbon black in a powder state, and 7 (c) is the Raman spectrum of the electrode region of the internal electrode portion in the ceramic body.

Referring to the drawings, the presence of a carbon material, such as, for example, carbon black, may be confirmed in the internal electrodes 121 and 122 and/or on the interfacial surface between the dielectric layer 111 and the internal electrodes 121 and 122 using the Raman spectrum.

Figure 8:
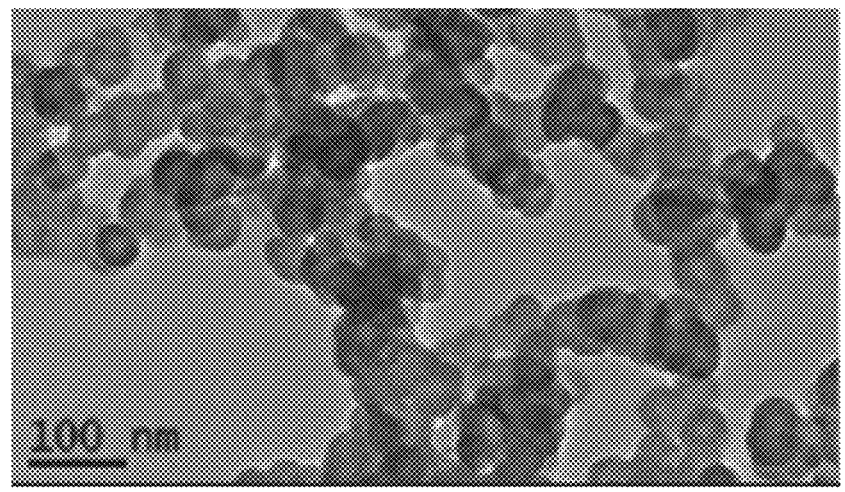
FIG. 8 is an image of a shape of carbon black obtained by a transmission electron microscopy (TEM).

FIG. 8 is an image of a shape of carbon black obtained by a transmission electron microscopy (TEM).

Referring to the drawings, the carbon black in the powder sol state before being mixed with the conductive paste for forming the internal electrode may be spherical conductive crystallized carbon black having a diameter of about 50 nm or less, but an example embodiment thereof is not limited thereto.

In the example embodiment, a multilayer ceramic capacitor has been described as an example of a ceramic electronic component, but an example embodiment thereof is not limited thereto, and the example embodiment may also be applicable to other types of ceramic electronic components, such as, for example, an inductor, a piezoelectric element, a varistor, and a thermistor.

According to the aforementioned example embodiments, a ceramic electronic component having improved electrical properties may be provided.

Also, a ceramic electronic components having improved high-temperature load reliability may be provided.

In the example embodiments, the terms "side portion," "side surface," and the like, may be used to refer to a surface formed taken in right/left directions with reference to a cross-section in the diagrams for ease of description, the terms "upper side," "upper portion," "upper surfaces," and the like, may be used to refer to a surface formed in an upward direction with reference to a cross-section in the diagrams for ease of description, and the terms "lower side," "lower portion," "lower surface," and the like, may be used to refer to a surface formed in a downward direction. The notion that an element is disposed on a side region, an upper side, an upper region, or a lower resin may include the configuration in which the element is directly in contact with an element configured as a reference in respective directions, and the configuration in which the element is not directly in contact with the reference element. The terms, however, may be defined as above for ease of description, and the scope of right of the example embodiments is not particularly limited to the above terms.

In the example embodiments, the term "connected" may not only refer to "directly connected" but also include "indirectly connected" by means of an adhesive layer, or the like. Also, the term "electrically connected" may include both of the case in which elements are "physically connected" and the case in which elements are "not physically connected." Further, the terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right of the example embodiments.

In the example embodiments, the term "example embodiment" may not refer to one same example embodiment, and may be provided to describe and emphasize different unique features of each example embodiment. The above suggested example embodiments may be implemented do not exclude the possibilities of combination with features of other example embodiments. For example, even though the features described in one example embodiment are not described in the other example embodiment, the description may be understood as relevant to the other example embodiment unless otherwise indicated.

An expression used in the singular encompasses the expression of the plural, unless it has a clearly different meaning in the context.

While the example embodiments have been illustrated and described above, it will be apparent to those skilled in the art that modifications and variations could be made without departing from the scope of the present invention as defined by the appended claims.

What is claimed is:

1. A ceramic electronic component, comprising:
a body including a dielectric layer and an internal electrode; and
an external electrode disposed on the body,
wherein a first carbon material is disposed in the internal electrode and a second carbon material different from the first carbon material is disposed at an interface between the dielectric layer and the internal electrode, and
wherein the first carbon material forms a plurality of cluster channels connected to each other or a plurality of cluster spots spaced apart from each other within the internal electrode and the second carbon material forms a plurality of cluster channels at the interface between the dielectric layer and the internal electrode.

2. The ceramic electronic component of claim 1, wherein the first carbon material includes carbon black.

3. The ceramic electronic component of claim 2, wherein the carbon black has a substantially spherical shape.

4. The ceramic electronic component of claim 2, wherein the carbon black has conductivity.

5. The ceramic electronic component of claim 2, wherein the carbon black has a particle diameter of 0.05 μm or less.

6. The ceramic electronic component of claim 1,
wherein a plurality of the first carbon materials are disposed in the internal electrode, and
wherein the internal electrode includes a cluster channel including the plurality of first carbon materials.

7. The ceramic electronic component of claim 1,
wherein a plurality of the first carbon materials are disposed in the internal electrode, and
wherein the internal electrode includes a cluster spot including the plurality of first carbon materials.

8. The ceramic electronic component of claim 1,
wherein the first carbon material and the second carbon material have different formations and/or sizes from each other.

9. The ceramic electronic component of claim 1, wherein the internal electrode includes nickel (Ni).

10. A method for manufacturing the ceramic electronic component of claim 1, comprising:
forming the internal electrode including mixing conductive particles and carbon material particles that are smaller than the conductive particles,
forming the body, and
forming the external electrode.

11. The method of claim 10, wherein the carbon material particles have a particle diameter of 0.05 μm or less.

12. The method of claim 10, wherein the conductive particles include nickel (Ni) particles.

13. The method of claim 12, wherein the carbon material particles have a particle diameter that is less than ½ of a particle diameter of the nickel (Ni) particles.

14. The method of claim 13, wherein the carbon material particles include carbon black.

15. The ceramic electronic component of claim 1, wherein each of plurality of cluster channels comprises particles of a corresponding carbon material are arranged linearly and are connected to each other.

16. The ceramic electronic component of claim 1, wherein the plurality of cluster spots comprises a plurality of particles of the first carbon material, the plurality of cluster spots being spaced apart from each other.

17. A ceramic electronic component, comprising: a body including a dielectric layer and an internal electrode; and an external electrode disposed on the body, wherein a first carbon material is disposed on the interfacial surface between the dielectric layer and the internal electrode and a second carbon material different from the first carbon material disposed in the internal electrode, and wherein the first carbon material forms a plurality of cluster channels arranged linearly on the interfacial surface between the dielectric layer and the internal electrode.

18. The ceramic electronic component of claim 17, wherein the first carbon material includes carbon black.

19. The ceramic electronic component of The ceramic electronic component of wherein the dielectric layer is in contact with upper and lower surfaces of the internal electrode, and wherein the first carbon material is disposed on an interfacial surface between the dielectric layer and the upper surface of the internal electrode and on an interfacial surface between the dielectric layer and the lower surface of the internal electrode.

* * * * *